Dec. 18, 1956  F. O. WISMAN  2,774,452
MAGNETIC CLUTCH AND CONTROL THEREFOR
Filed Feb. 11, 1952  3 Sheets-Sheet 1

INVENTOR.
FRANKLIN O. WISMAN
BY Cecil F Arens
ATTORNEY

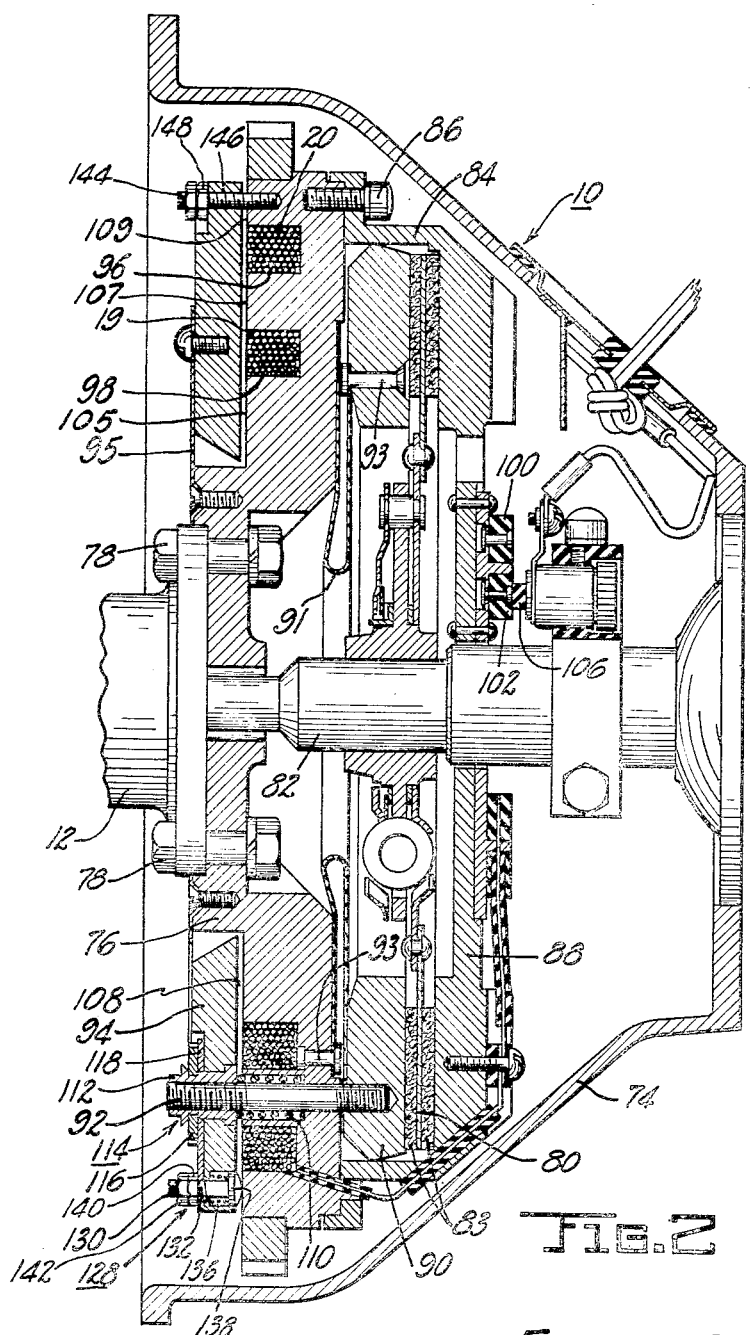

Dec. 18, 1956    F. O. WISMAN    2,774,452
MAGNETIC CLUTCH AND CONTROL THEREFOR
Filed Feb. 11, 1952    3 Sheets-Sheet 3
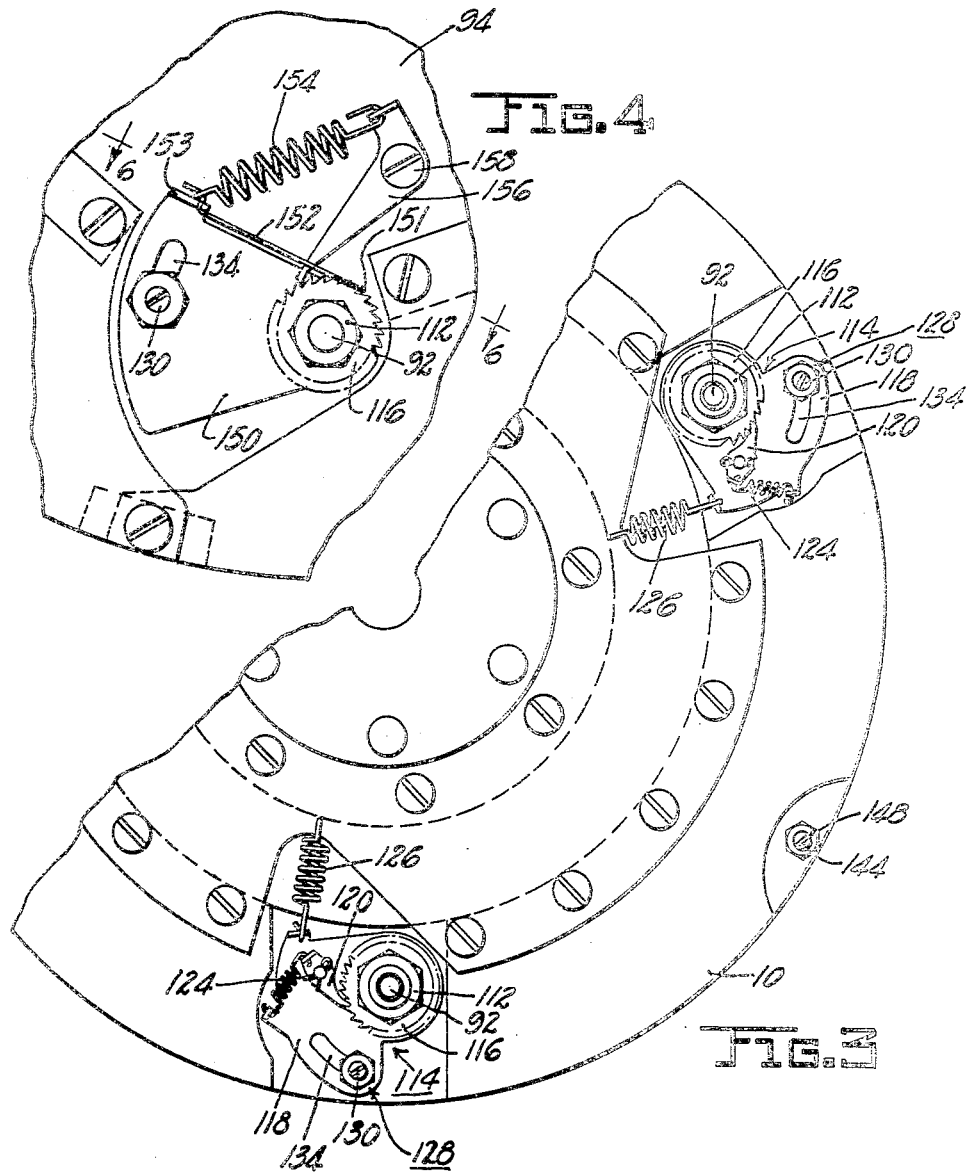
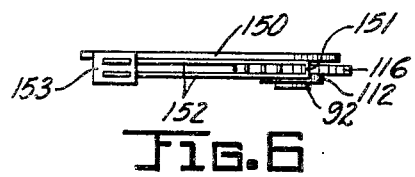
INVENTOR.
FRANKLIN O. WISMAN
BY
Cecil J. Arera
ATTORNEY

United States Patent Office 2,774,452
Patented Dec. 18, 1956

2,774,452

MAGNETIC CLUTCH AND CONTROL THEREFOR

Franklin O. Wisman, South Bend, Ind., assignor to Bendix Aviation Corporation, South Bend, Ind., a corporation of Delaware Application February 11, 1952, Serial No. 270,985

13 Claims. (Cl. 192—84)

This invention relates to devices of a type having a rotatable member to be frictionally engaged by another member, the latter of which may or may not be rotated as a result of said engagement.

The invention herein disclosed concerns a fully automatic clutch operable upon manipulation of a vehicle gear shift lever whose movements are sensed by a control circuit which coordinates said movements with clutch engagement.

It is a purpose of this invention to interpose a magnetic clutch in the drive shaft of a vehicle between the engine and rear wheels so that manipulation of the gear shift lever to change the gear ratio in the transmission will automatically operate the clutch.

It is an object of this invention to provide a magnetic clutch with means capable of automatically adjusting for wear of the frictionally engaged members.

An important object of the invention resides in the provision of a centrifugally actuated adjustment for use with frictional clutches and the like to compensate for wear between the engaging members in order to maintain uniform contact pressure therebetween.

A further object is to provide an improved mechanism for sensing wear between two frictional engaging surfaces and automatically compensating for this wear in order to obtain maximum performance.

The above and other objects and features of the invention will be apparent from the following description of the apparatus taken in connection with the accompanying drawings which form a part of this specification, and in which:

Figure 2 illustrates a view in section of an improved magnetic clutch embodying a novel adjusting feature therefor;

Figure 3 is a fragmentary end view of the clutch of Figure 2, depicting the centrifugal mechanism;

Figure 4 is a modified form of centrifugal mechanism used in association with the clutch of Figure 2;

Figure 6 is a view in side elevation taken on the line 6—6 of Figure 4.

Figure 1:
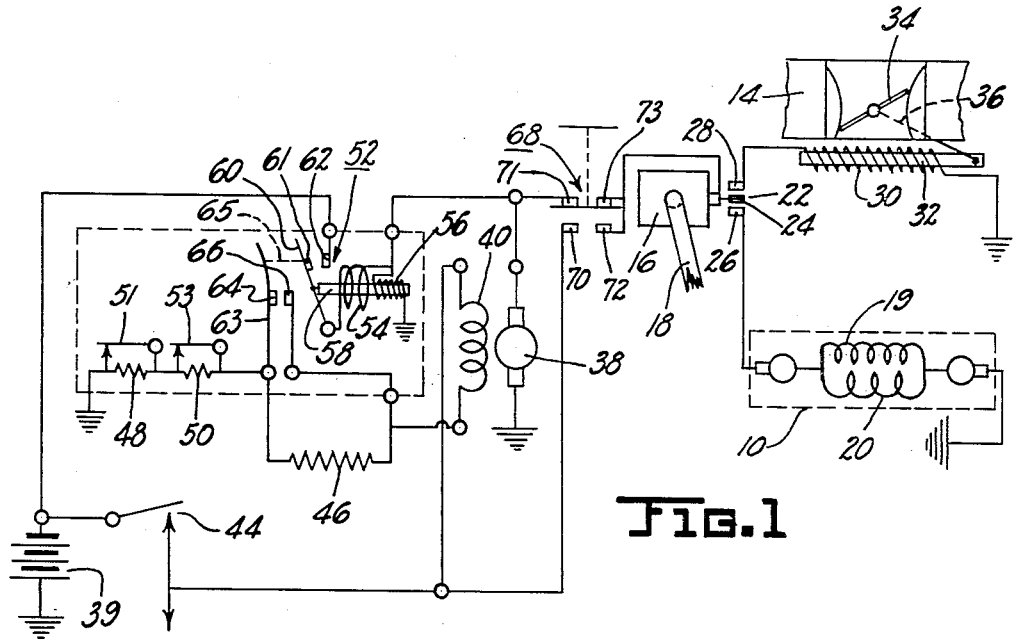
Figure 1 is a circuit diagram used in controlling the device of the invention.

Referring now to Figure 1 of the drawings, the reference numeral 10 designates a magnetic clutch located in the drive shaft 12 of engine 14. The clutch is associated with a vehicle which is provided with the usual gear box 16 and hand shift lever 18. The clutch 10 is of the magnetic type and is operated by the control circuit of Figure 1 which embraces, in addition to the clutch windings 19 and 20, a shift switch 22, actuated by manipulation of the shift lever 18. The shift lever 18 is so connected with the switch 22 that whenever the vehicle is in gear, finger 24 is in engagement with contact element 26, to thereby energize the windings 19 and 20. With the shift lever 18 in neutral position, the finger 24 contacts the element 28, thus energizing winding 30, causing armature 32, which is connected to throttle 34 by a linkage 36, to close the throttle for establishing a predetermined engine speed limit. That is, when a shift is made, even though the accelerator treadle, not shown, is held to the floor during the shifting operation, the throttle 34 will be automatically moved to a position of limiting the engine speed when the clutch is released. This action of the throttle is the same when shifting through any one or all gear ratios and produces a smooth shift even under adverse conditions. Obviously, driver coordination between throttle position and gear shifting is reduced to a minimum.

A separately excited generator 38 has its output connected to the windings 19 and 20 of the clutch and to battery 39. The generator, which is drivably connected to the engine 14 in any suitable manner, not shown, is equipped with a field winding 40 energized from the battery 39, through the vehicle ignition switch 44. A resistor 46 is placed in series with the field winding 40 and also with resistors 48 and 50, the two latter resistors representing voltage and current limiters, respectively, used in almost all conventional generating systems for automotive vehicles, and forming no part of this invention. The resistors 48 and 50 are equipped with normally closed switches 51 and 53, operable when the voltage and current, respectively, attain predetermined upper limits.

A cut-out switch 52 is interposed between the battery 39 and the output of the generator 38 to automatically connect the battery to the generator when the voltage of the latter reaches a predetermined lower limit and to disconnect the battery from the generator when the voltage of the latter becomes less than said lower limit. The cut-out switch is of the conventional type, except for slight modifications to be hereinafter described and embraces a pair of windings 54 and 56, and an armature 58 articulately linked to switch arm 60 which carries a contact 61, the latter of which engages contact button 62. Generator voltage is proportional to engine speed up to the time that contact 61 engages contact 62. When the engine has attained a preselected speed, corresponding to the predetermined lower limit of voltage, the potential across the coil 56, which has been calibrated for the predetermined voltage, is sufficient to close the contact 61 on the contact 62, thus connecting the coil 54 in series with the battery and generator. The windings 54 and 56 are so related that when the generator voltage reaches said lower limit, to thereby close the contact 61 on the contact 62, current through the windings is in such a direction, assuming that this lower limit voltage is greater than the battery voltage, as to produce an additive magnetomotive force for holding the cut-out switch closed. However, when the generator voltage becomes less than said upper limit, assuming that the battery voltage is at the upper limit, current through the two windings is in such a direction as to produce a magnetomotive force that is subtractive, thus opening the switch 52. Switch arm 63 carries contact 64 and is mechanically linked to the arm 60 through an insulating connection 65 so that closing the cut-out switch also moves contact 64 against contact 66 to thereby shunt the resistor 46. This resistor is located with respect to the clutch 10 and engine 14 to sense their respective temperatures and is of a type whose resistance varies inversely with the ambient temperature. That is, the resistor has a negative temperature coefficient of resistivity. Also, the current passing through the resistor causes it to heat, which further lowers its resistance.

A push button switch 68 normally connects the clutch windings to the generator output through contacts 71 and 73. If it should be necessary to start the vehicle by pushing it, the switch 68 is closed on contacts 70 and 72 to thereby energize the clutch from the battery 39.

The clutch 10, see Figure 2, comprises a housing 74, a flywheel 76, drivably secured to the drive shaft 12 by bolts 78 and a driven plate 80, splined to a shaft 82. Any approved lining material 83, such as is used with brakes and clutches is applied to both sides of the plate 80. A cover 84 is secured to the flywheel 76 by bolts 86. The cover is equipped with a rear wall 88 which arrests the driven member 80 when pressure is applied thereto through pressure pad 90 and jack screws 92. These jack screws are adjustably carried by a ring armature 94, which is floatably supported on a thin disc 95 mounted on the flywheel 76. The armature and flywheel rotate together as a unit, with the armature being adjustable with respect to the face of the flywheel. The pressure pad 90 is mounted on a resilient plate 91 securely fixed to the flywheel by suitable means such as rivets 93. Annular grooves 96 and 98 in the face of the flywheel receive the coils or windings 19 and 20, respectively. These windings are suitably connected to slip rings 100 and 102 on which ride carbon brushes 106, only one of which is shown, for conducting the energizing current to the clutch coils. Current flowing in the coils establishes a magnetic field in the flywheel and armature, thus attracting the latter to the former with a force depending upon the energizing current. The flywheel 76 and armature 94 together provide a magnetic circuit having an air gap 108, between pole faces 105, 107 and 109. The flywheel 76, armature 94, pressure pad 90, and cover 84 rotate together as one member of the clutch and the plate 80 is frictionally engaged thereby to be driven as the other member of the clutch.

The jack screws 92 have one end threaded into the pressure pad 90, with the other end of the jack screws threadedly engaging adjustable nuts 112, rotatably carried by the armature 94. A coil spring 110, encircles each of the jack screws, with the opposite ends of the spring abutting the flywheel and armature, respectively, to thereby separate the two when the clutch is deenergized.

In order to compensate for wear of the lining 83 so that there will always be a fixed relation between the armature 94 and the pole faces 105, 107 and 109 of the flywheel, with a minimum final air gap, a centrifugally actuated adjusting mechanism 114 is provided for each jack screw. This mechanism comprises a ratchet wheel 116 securely fixed to the nut 112 for threading the same onto the jack screw 92. A flyweight 118 is supported for rotation relative to the nut 112. A pawl 120 is pivotally carried by the flyweight 118 for engagement with the ratchet wheel 116. A spring 124 has one end connected to the pawl and the other end fastened to the flyweight to thereby rotate the pawl into engagement with the ratchet wheel 116. A spring 126 has its ends connected to the flyweight and to the armature, respectively, in a manner to rotate the flyweight inwardly, see Figure 3. Beyond a predetermined engine speed, that is, after the centrifugal force developed by the flyweight has reached a given value, the flyweight will rotate outwardly against the force of the spring 126, thus tending to turn the nut 112 in a direction which will cause the jack screw to move inwardly to compensate for wear of the lining 83.

Means 128 is provided for detecting wear of the lining 83 and for controlling the mechanism 114. This means includes a probe bolt 130 which passes through an opening 132 in the armature and a slot 134 in the flyweight 118. A loading spring 136 is interposed between a head 138 of the probe bolt and the armature, thus causing the flyweight to frictionally engage the armature. When making the initial setting, nut 140 is turned onto the probe bolt 130 until the head 138 extends a prescribed distance beyond the back surface of the armature. The distance that the head 138 extends beyond this surface depends on the desired minimum operating air gap between flywheel and armature. A lock nut 142 holds the nut 140 fixed once the probe bolt distance beyond the armature surface is established. A stud 144 passes through a hole 146 in the armature and threadedly engages the flywheel 76. A nut 148 limits the maximum movement of the armature 94 away from the pole faces 105, 107 and 109 formed in the flywheel surface.

With the clutch deenergized, the springs 110 urge the armature 94 against the nuts 148, thus establishing the maximum air gap between the armature and the flywheel as determined by the adjustment of nuts 148. At this time, the adjusting nuts 112 are turned on the jack screws 92 until the distance from the face of the pressure pad to the lining 83 and the distance from the armature to the pole faces of the flywheel bear a definite fixed relationship, such that when the clutch is energized, the armature will cause engagement between the frictional surfaces of the pressure pad and the lining 83 with a predetermined minimum air gap remaining between the armature and flywheel. The lining wear detecting means 128 is now finally adjusted so that the head 138 of the probe bolt 130 just contacts the pole face 109 of the flywheel. Any lining wear which reduces this minimum air gap compresses the spring 136 to thereby remove the clamping action between the flyweight and the armature. This releases the flyweight 118 for rotation outwardly by centrifugal action or inwardly under the influence of the spring 126.

If the flyweight 118 is released at a time when engine speed is below a predetermined value, the spring 126 will pull the flyweight inwardly, see Figure 3, causing the pawl to drop into the next tooth of the ratchet wheel. An increase in engine speed beyond this predetermined value will cause the flyweight to swing outwardly, assuming the lining material has worn since the last adjustment, which rotates the ratchet wheel 116 in a direction to restore the armature to a position wherein the prescribed minimum air gap now exists between the latter and the pole faces of the flywheel.

A modified form of centrifugally actuated adjusting mechanism is shown in Figure 4, wherein structure identical to that of Figures 2 and 3 will be given the same designating numeral. The modification comprises a flyweight 150 and ratchet wheel 116, secured to the adjustable nut 112 the latter of which threadedly engages the jack screw 92. The flyweight 150 is associated with the lining wear detecting means 128, which controls the adjusting mechanism in the same manner as described above in connection with the flyweight 118. A wire pawl 152 has one end fastened to a tab 153 of the flyweight 150 with the other end 151 of the wire formed for engagement with the ratchet wheel 116, see Figure 6, so that rotation of the flyweight in a counterclockwise direction due to centrifugal action will also rotate the ratchet wheel counterclockwise. Rotation of the flyweight 150 in a clockwise direction under the influence of spring 154, is relative to the ratchet wheel, which is positively restrained against clockwise rotation by a latch member 156, pivoted at 158 on the armature 94. The latch member 156 has one end in engagement with the ratchet wheel and the other end formed to receive one end of the spring 154, the other end of the latter being secured to the flyweight 150. This latch member provides a positive stop for the ratchet wheel, thus precluding clockwise rotation thereof due to any frictional drag existing between the ratchet wheel and flyweight or between the nut and flyweight when the latter is rotated by the spring 154.

Figure 5:
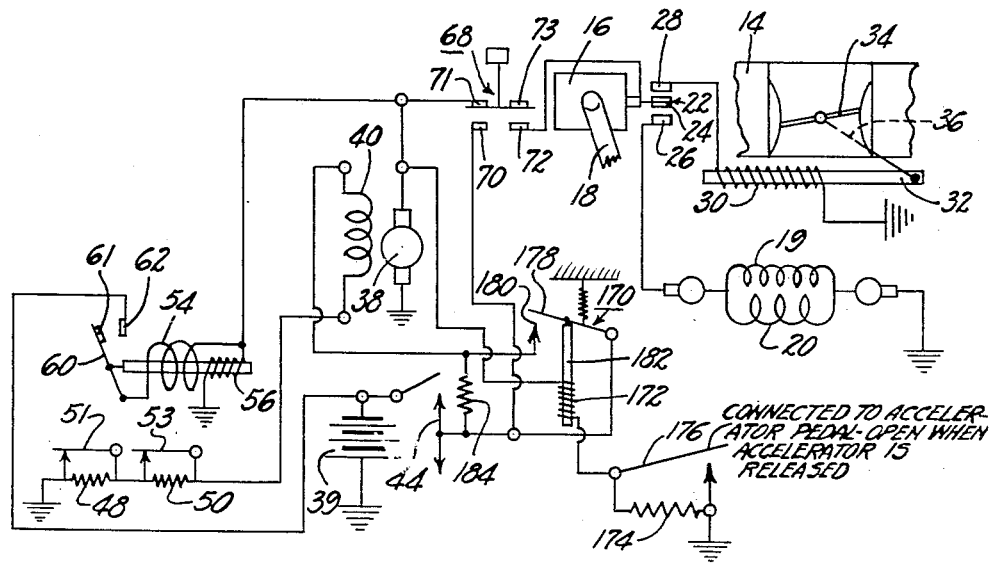
Figure 5 illustrates a modified form of the control circuit of Figure 1.

Figure 5 illustrates a modified version of the control circuit of Figure 1 and differs therefrom primarily in not utilizing the conventional cut-out switch 52, associated windings 56 and 54, and resistors 48 and 50 as elements of the switch mechanism for controlling the magnetic clutch. The modified control circuit embraces a relay 170 having a coil 172 calibrated for a predetermined voltage and connected to the output of the generator 38. A resistor 174 is connected in series with the coil 172.

An accelerator operated switch 176 is connected in shunt with the resistor 174. The switch 176 is normally open when the accelerator, not shown, is released, and is closed when the accelerator is depressed. The relay 170 is designed so that with the switch 176 closed, a predetermined voltage is required to close switch arm 178 on contact 180. Also the design of the relay 170 permits the voltage across the coil 172 to be reduced below said predetermined value before the switch arm 178 opens. Therefore, engine speed can drop below that required to close the switch arm 178 without effecting release of the relay and consequent deenergization of the clutch before a predetermined lower limit of engine speed is reached. The resistor 174 is, therefore, of such a value as to cause the generator output voltage to drop a preselected amount below said predetermined voltage before the switch arm opens. An armature 182 has one end connected to the switch arm 178 but insulated therefrom, and the other end magnetically associated with the coil 172 for actuation upon energization of said coil. A resistor 184, whose characteristics are the same as those of the resistor 46 of Figure 1, is connected in the field winding 40 of the generator. The ignition switch 44 controls current from the battery 39 to the field winding 40 via the switch arm 178, which is connected in parallel with the resistor 46. The control circuit is provided with the push button switch 68 and shift switch 22 which perform the same functions as in Figure 1. It will be noted that resistor 174 is in series with the relay coil 172 when the engine is set for fast idle, the accelerator switch 176 being open at this time. (Fast idle is an inherent feature of all automatic chokes.) Obviously, this reduces the voltage across the voltage calibrated coil 172 below that required to actuate the armature 182. Depressing the accelerator pedal, not shown, closes the switch 176, thus raising the terminal voltage of the coil 172. If the engine speed is such as to produce the predetermined voltage aforementioned, depending on the calibration of the relay coil 172, the switch arm 178 will be closed, thus providing maximum field excitation for the field 40. The engine speed necessary to produce this predetermined voltage depends on engine ambient temperature to which the resistor 46 is subjected. If the engine temperature has attained a given desired operating condition, the ohmic resistance of the resistor 46 will be such as to allow enough current through the field winding 40 to establish said predetermined generator output voltage for a given engine speed. If, on the other hand, when this given engine speed is attained, engine temperature is below the desired operating temperature, the ohmic resistance of the resistor 46 will be such as to allow a minimum of excitation current through the field winding thus reducing the generator output voltage for the given engine speed. In order to reach this predetermined voltage, either one of two things could be done: (1) increase engine ambient temperature thus reducing the resistance of the resistor 46, or (2) increase engine speed beyond said given speed. However, for a given engine speed, the engine ambient temperature must reach a preselected value to provide a predetermined generator output voltage. This resistor 46 changes the proportionality of the generator output with respect to engine speed.

Operation and function of the automatic clutch is as follows:

If it should be necessary to push the vehicle to start the engine, the switch 68 is closed on contacts 70 and 72; this connects the clutch windings to the battery 39 through the ignition switch 44.

With the engine running and the gear shift lever in neutral, switch element 24 will contact switch element 28 to thereby energize the solenoid 30, thus closing the throttle 34 to a predetermined position in which the engine speed is limited to about 2,000 R. P. M. or less, for example.

Whether or not initial clutch engagement can be attained if the vehicle transmission is shifted into forward or reverse gear, depends upon the selected value of the resistance 46 at some given temperature condition and upon the engine speed. (The cut-out switch 52 of Figure 1 is now assumed to be open because of the inadequate voltage across the winding 56 at this time.) Furthermore, until engine temperature, or clutch temperature in some instances, reaches a preselected value, the resistance 46 is not going to pass sufficient current to enable the generator output to reach that value required for clutch engagement, this prevents stalling the engine when an attempt is made to connect a cold engine to a load and prevents creepage or drag if the engine carburetor is equipped with automatic choke and fast idle.

After engine temperature has reached a predetermined value, the resistor 46 is capable of passing enough exciting current through the field 40 to effect clutch engagement at some given engine speed, which can be in the neighborhood of engine idling speed. Hence, if a shift were made from neutral into any one of the forward or reverse gears at this time, a soft clutch engagement would result and a consequent smooth acceleration of the vehicle as the engine speed is increased, all without very little thought being given by the driver to coordinating gear shifting with throttle position.

Assume a set of conditions wherein the generator output has built up sufficiently to close the cut-out switch 52, that is, engine speed has been increased beyond idling, with engine temperature at or above said predetermined value, thus shunting the resistor 46 so that full field excitation is available for the field winding 40. Manipulating the lever 18 at this time to shift into any one of the forward or reverse gears will produce a somewhat harder clutch engagement than experienced above, but acceleration is relatively smoother than would be encountered under similar circumstances where a manual clutch engagement was made. If engine speed should now drop below a predetermined value, current through coil 54 will be reversed in direction. This will create a magnetic field in opposition to the holding force of the magnetic field created by the current in coil 56 so as to cause the armature 58 to be released. This breaks the connection between contacts 64 and 66, which again places the resistor 46 in series with the field 40 so as to reduce the field excitation in the generator. Under these conditions, the clutch becomes disengaged.

It will be observed that the shift switch 22 is controlled by the position of the shift lever 18 which terminates in the gear box 16. This shift switch 22 opens the clutch circuit and closes the throttle circuit, embracing the coil 30 and the armature 32, each time a shift is made from one gear ratio to another gear ratio, thus coordinating clutch disengagement with throttle position.

Although this invention has been described in connection with certain specific embodiments, the principles are susceptible of numerous other applications that will readily occur to persons skilled in the art.

Having thus described the various features of the invention, what I claim as new and desire to secure by Letters Patent is:

1. In a clutch having two rotatable members provided with surfaces for frictional engagement therebetween, magnetically controlled means for bringing the members into engagement, said means including an armature supported on one of the members for limited movement relative thereto and providing a magnetic circuit therewith, a pressure pad arranged contiguously said other member and attached to said one member for rotation therewith and having a force transmitting connection to said armature, centrifugally actuated mechanism interposed in the connection between said pad and armature for adjusting said connection as one of the surfaces wears, said mechanism comprising a screw threadedly engaging said connection, a weight responsive to centrifugal force for rotating said screw to thereby force said pressure pad and armature apart, means for preventing rotation of said screw in one direction, and means for detecting wear of said one surface.

2. In a clutch having two rotatable members formed with surfaces for frictional engagement therebetween, magnetically controlled means for causing frictional engagement between said members, and mechanism actuated by centrifugal force for adjusting said means to compensate for wear of the surface of one of said members, said mechanism comprising a jack screw associated with one of said surfaces and a threaded element engaging said jack screw, a weight responsive to centrifugal force for rotating the threaded element to thereby force said surfaces into closer proximity, means for preventing rotation of said element in one direction, and means for preventing movement of said weight until the surface of one of said members has worn to a predetermined degree.

3. In a clutch having two rotatable members provided with surfaces for frictional engagement therebetween, magnetically controlled means for causing frictional engagement between said surfaces, and mechanism for adjusting said means to compensate for wear of one of the surfaces, said mechanism comprising a jack screw associated with one of said surfaces and a threaded element engaging said jack screw, a weight responsive to centrifugal force for rotating said element on said screw to thereby force said surfaces into closer proximity, and means for preventing rotation of said element in one direction.

4. In a clutch having two rotatable members formed with surfaces for frictional engagement therebetween, magnetically controlled means for causing frictional engagement between said surfaces, and centrifugally controlled mechanism associated with said means for adjusting the latter to compensate for wear of one of the surfaces, said mechanism comprising a jack screw associated with one of said surfaces and a threaded element engaging said jack screw, a weight responsive to centrifugal force for rotating said element on said screw to thereby force said surfaces into closer proximity, and means for preventing movement of said weight until the surface of one of said members has worn to a predetermined degree.

5. In a clutch having two rotatable members formed with surfaces for frictional engagement therebetween, electrically controlled means for causing frictional engagement between said surfaces, and mechanism actuable by centrifugal force and associated with said means for adjusting the latter to compensate for wear of one of the surfaces, said mechanism comprising a jack screw associated with one of said surfaces and a threaded element engaging said jack screw, a weight responsive to centrifugal force for rotating said element on said screw to thereby force said surfaces into closer proximity, and means for preventing movement of said weight until the surface of one of said members has worn to a predetermined degree.

6. In a clutch having two rotatable members provided with surfaces for frictional engagement therebetween, a magnetic circuit embracing one of the members and an armature movable with respect thereto, means associated with the armature for detecting wear of one of the surfaces, and a centrifugally actuated adjusting mechanism carried by the armature and controlled by said means for repositioning the armature with respect to said one member in order to compensate for wear of said one surface, said mechanism comprising a threaded element rotatably carried by said armature, a jack screw for said element fastened contiguously with said one surface, a weight responsive to centrifugal force for rotating said element, and means for preventing rotation of said element in one direction.

7. In a device of the type having a rotatable member provided with a surface to be frictionally engaged by another surface provided in a second member, means for detecting wear of said surfaces, and centrifugally actuated mechanism controlled by said means for adjusting one of said members to compensate for wear of said surfaces, said mechanism comprising a jack screw associated with one of said surfaces and a threaded element engaging said jack screw, a weight responsive to centrifugal force for rotating said element on said screw to thereby force said surfaces into closer proximity, and means for preventing rotation of said element in one direction.

8. In a clutch having two rotatable members provided with surfaces for frictional engagement therebetween, magnetically controlled means for bringing the members into engagement, said means including an armature supported on one of the members for limited movement relative thereto and providing a magnetic circuit therewith, a pressure pad arranged adjacent said other member and attached to said one member for rotation therewith and having a force transmitting connection to said armature, a centrifugally actuated mechanism interposed in the connection between said pad and armature for adjusting said connection as one of the surfaces wears, and means connected to said mechanism for detecting wear of said one surface, said means comprising a spring loaded cylindrical member passing through said armature, movement of said cylindrical member releasing said mechanism for adjusting said connection, said cylindrical member being movable against the force of its associated spring after a predetermined degree of wear of said one surface.

9. In a clutch having two rotatable members provided with surfaces for frictional engagement therebetween, centrifugally actuated mechanism for adjusting one of said members to compensate for surface wear and comprising a jack screw associated with one of said surfaces and a threaded element engaging said jack screw, a weight responsive to centrifugal force for rotating said element on said jack screw to thereby force said surfaces into closer proximity, and means normally restraining said centrifugal mechanism, including a device actuable after a predetermined amount of surface wear to release said mechanism.

10. The combination with a magnetic clutch adapted to connect the drive shaft of an internal combustion engine to the driven shaft, of a control circuit for the clutch comprising a winding associated with the clutch, means for sensing engine speed and for supplying energizing current to said winding, and a device connected to said means for controlling the energizing current, said device embracing a temperature sensing element located in a manner to sense engine or clutch temperature, whichever is higher, and having characteristics such as to cause an increase in energizing current when the temperature of said engine or clutch rises above a prescribed value, and means actuable at a predetermined engine speed for shunting said sensing element to thereby cause an increase in energizing current over that available when the sensing element is not shunted.

11. In a clutch having two rotatable members provided with surfaces for frictional engagement therebetween, means for positioning said members when disengaged so that their surfaces have a predetermined spaced relationship with respect to each other, a centrifugally actuated mechanism for reestablishing said relationship when destroyed due to surface wear between said members, said mechanism including a jack screw, a flyweight, a toothed member threadedly engaging said jack screw, a pawl interposed between the toothed member and the flyweight to rotate the toothed member by the centrifugal action of the flyweight, resilient means connected to the flyweight for rotating the same in a direction opposite to the centrifugal force acting thereon, said pawl allowing rotation of the flyweight in the opposite direction, and means normally restraining said flyweight against rotation including a device actuable after a predetermined amount of surface wear to release said flyweight.

12. An apparatus of the class defined in claim 11, wherein means is provided for holding said toothed member against rotation when the flyweight is rotated under the influence of said resilient means.

13. The combination with a magnetic clutch adapted to connect the drive shaft of an internal combustion engine to its driven shaft, of a control circuit for the clutch comprising a winding associated with the clutch, means for sensing engine speed and for supplying energizing current to said winding, and means for controlling the energizing current, said latter-mentioned means including a temperature sensing element located so as to sense engine temperature and having characteristics such as to cause an increase in energizing current when the temperature of said engine rises above a prescribed value, and a device responsive to a condition which is a function of engine speed for shunting said temperature sensing element to thereby cause an increase in the energizing current over that available when said element is not shunted.

References Cited in the file of this patent

UNITED STATES PATENTS

| Number | Name | Date |
|---|---|---|
| 505,970 | Weber | Oct. 3, 1893 |
| 1,049,957 | Whitcomb | Jan. 7, 1913 |
| 1,491,426 | Schunemann | Apr. 22, 1924 |
| 1,823,334 | Payne | Sept. 15, 1931 |
| 1,865,772 | Lyman | July 5, 1932 |
| 1,882,807 | Gillett | Oct. 18, 1932 |
| 1,891,982 | Hodgson | Dec. 27, 1932 |
| 1,925,956 | Easter | Sept. 5, 1933 |
| 2,070,813 | Stearns et al. | Feb. 16, 1937 |
| 2,073,357 | Wemp | Mar. 9, 1937 |
| 2,091,269 | Colman | Aug. 31, 1937 |
| 2,102,598 | McDill | Dec. 21, 1937 |
| 2,246,231 | Almen | June 17, 1941 |
| 2,290,513 | Wemp | July 21, 1942 |
| 2,353,840 | McKechnie | July 18, 1944 |
| 2,513,521 | Sampietro et al. | July 4, 1950 |
| 2,692,035 | Rabinow | Oct. 19, 1954 |

FOREIGN PATENTS

| 635,792 | Great Britain | Apr. 19, 1950 |